United States Patent

Seybold

[15] 3,680,913

[45] Aug. 1, 1972

[54] ATTACHMENT DEVICE FOR A RETAINING BELT

[72] Inventor: Rolf Seybold, Eichenstrasse 21a, Solingen, Germany

[22] Filed: Sept. 3, 1969

[21] Appl. No.: 854,865

[30] Foreign Application Priority Data

Sept. 6, 1968 Germany.............P 17 81 199.3
April 22, 1969 Germany.............P 19 20 264.3
Nov. 8, 1968 Germany.............P 18 07 823.4

[52] U.S. Cl....................................297/386, 188/1 C
[51] Int. Cl.................................................A62b 35/60
[58] Field of Search..............297/384, 386, 388, 389; 280/150 SB; 188/1 C

[56] References Cited

UNITED STATES PATENTS

| 3,087,584 | 4/1963 | Jackson et al.................188/1 C |
| 3,198,288 | 8/1965 | Presunka.......................188/1 C |
| 3,438,674 | 4/1969 | Radke et al...................297/386 |
| 3,446,533 | 5/1969 | Radke et al...................297/386 |
| 3,493,082 | 2/1970 | Bell..............................188/1 C |

FOREIGN PATENTS OR APPLICATIONS 1,048,413  11/1966  Great Britain................297/386

*Primary Examiner*—James T. McCall
*Attorney*—Holman & Stern

[57] ABSTRACT

An attachment device for a retaining belt, for instance a device for holding the end of a seat belt to the vehicle frame. The device is arranged so that deformation work is done when the retaining belt is tensioned. The device has a plastically-deformable body and a tool acting on the body at an angle to the line of action of the tension. When the belt is tensioned, the tool deforms the body and absorbs energy. The effect of static friction between the tool and the body at the beginning of the deformation movement is reduced, for instance by having projections on the body or by coating the surface of the tool or of the body.

15 Claims, 7 Drawing Figures

INVENTOR.
ROLF SEYBOLD.

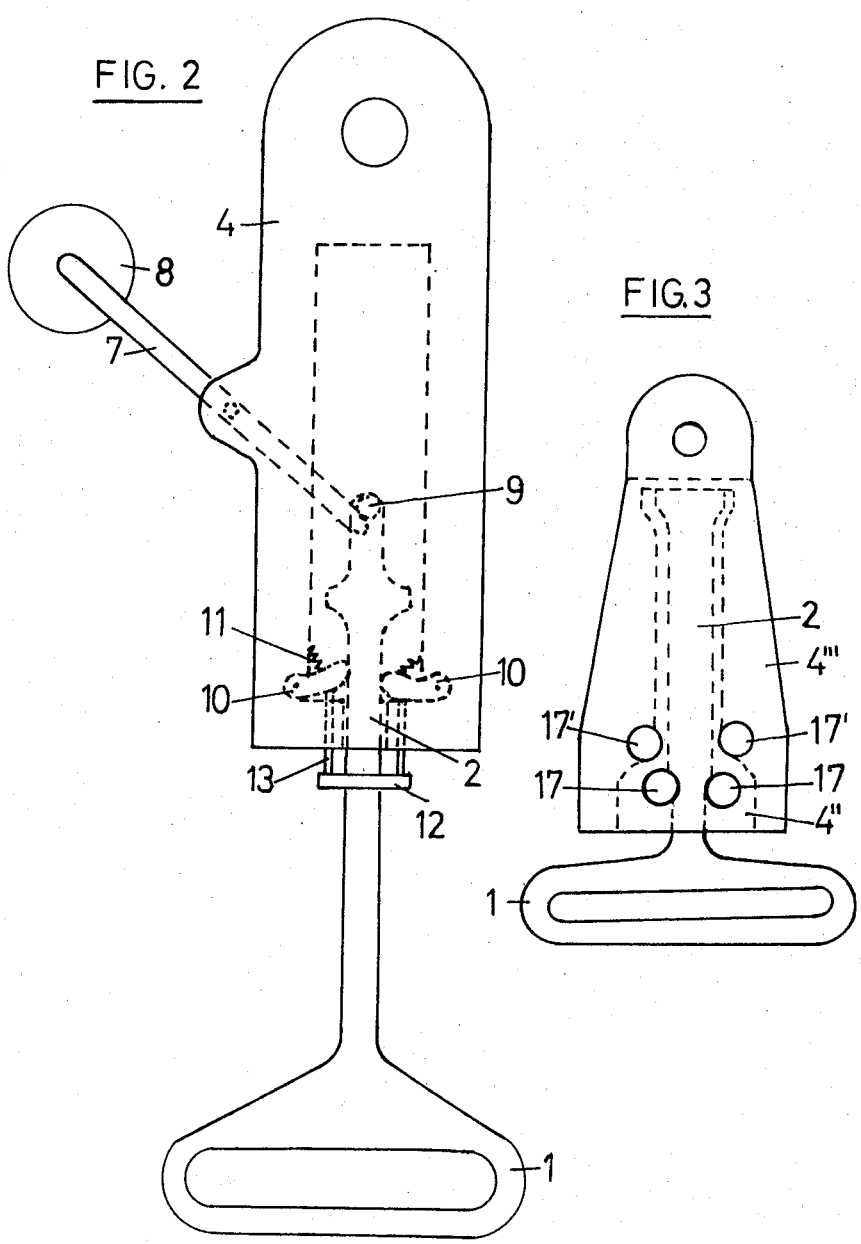

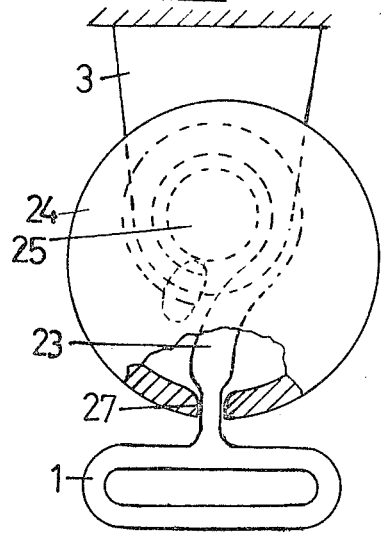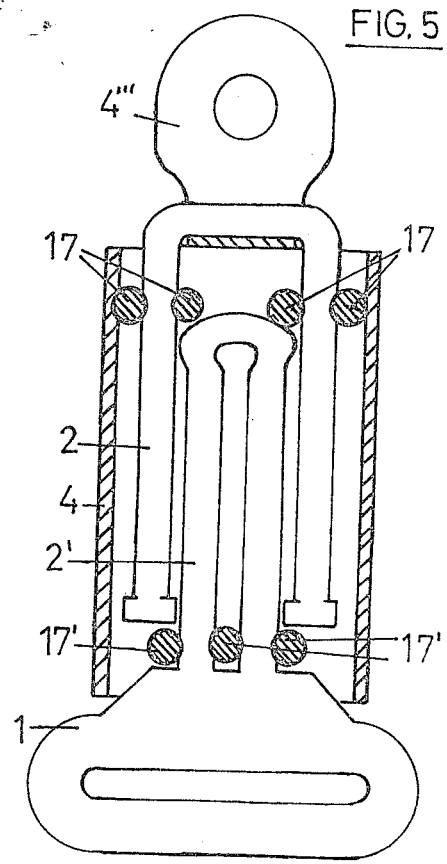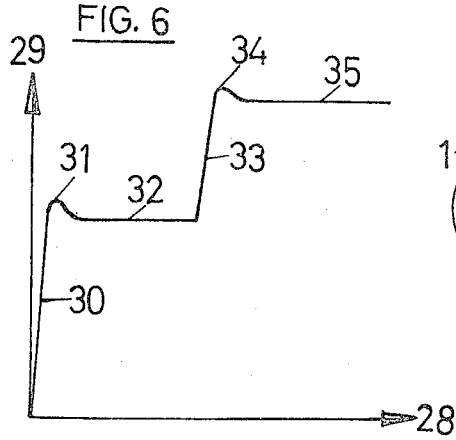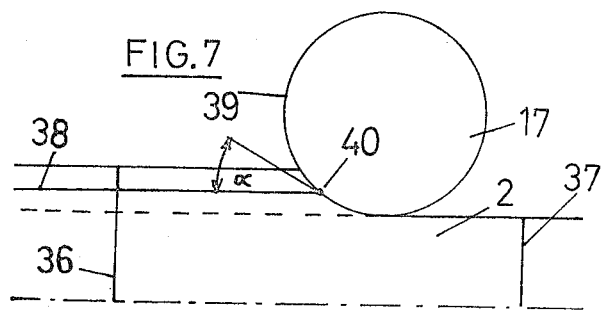

ATTACHMENT DEVICE FOR A RETAINING BELT

BACKGROUND OF THE INVENTION

This invention relates to an attachment device for a retaining belt which may be subjected to tensile stress, particularly for a seat belt for a land or air vehicle.

It is desirable to construct the attachment device so that when the device is subjected to tensile stress, there is an effective damping of the force produced and as great a part as possible of the damping work is carried out along a permitted path of movement. Primarily, any spring-back, such as is produced by elastic deformation, should be avoided. In collisions and the like, any impact-type loading, which would be caused by an impermissibly large deceleration of the moving body of the vehicle occupant, should be avoided. On the other hand, a restricted, available movement should be fully utilized in order to absorb as much damping work as possible in the context of the permissible braking deceleration. In order to achieve this, it is necessary to reach the physiologically permissible breaking deceleration (below which injuries to the body are not too severe) as soon as possible after the beginning of the damping movement. This permissible braking deceleration is about 30 to 40 g. In this manner, it is possible to protect vehicle occupants from the results of accidents even if the vehicle has a relatively high speed.

SUMMARY OF THE INVENTION

According to the present invention, there is provided an attachment device for a retaining belt which may be subjected to tensile stress, the attachment device having first connecting means (such as a lug) for mounting the device (e.g. connecting the device to the vehicle), second connecting means (such as an eye) for connecting the belt to the device, with the second connecting means being movable with respect to the first connecting means in the direction of the tensile stress.

At least one plastically-deformable body connected to one of the connecting means, at least one tool for acting on the plastically-deformable body along a resultant line of action at an angle to the direction of the tensile stress, and for plastically deforming the plastically-deformable body and applying a deformation force to the plastically-deformable body which is substantially constant along a substantial proportion of the length of relative movement between the tool and the plastically-deformable body, thereby enabling the second connecting means to be drawn away from the first connecting means when the belt is subjected to sufficient tensile stress, and means for reducing the effect of static friction between the tool and the plastically-deformable body at the beginning of the deformation movement.

The plastic deformation ensures that the impact energy is dissipated before the elastic deformation of the actual retaining belt (normally made of a woven fabric) reaches a notable value. By employing the attachment device in accordance with the invention, one can even use fully inelastic retaining belts. In this way, the plastically-deformable body will itself be put in tension because it is not directly deformed by the tensile force but rather by forces acting at an angle to the direction of the tensile stress; these forces are components of the resolved tensile force and in this way can be many times larger than the tensile force. By applying a deformation force which is substantially constant along a substantial proportion of the length of relative movement between the tool and the plastically-deformable body, a very high though precisely definable deformation force can be achieved right at the beginning of the deformation path. As the deforming or damping work is the product of the deforming force and the length of the deformation path or extension path of the system, a very large amount of damping work is obtained. At the same time, it is important that the permitted braking force is not exceeded. Because of this, means are provided for reducing the effect of friction between the tool and the plastically-deformable body during the changeover from static to dynamic friction at the beginning of the deformation movement.

These friction reducing means can be of various types. Thus bump-like, knob-like or flat projections can be provided on the surface of the plastically-deformable body or on the tool, by means of which the deformation begins particularly smoothly.

In addition or alternatively, various surface facing techniques can be used, such as galvanization or electroplating with a low-friction metal, bonderizing or otherwise coating the deforming tool or plastically-deformable body. In particular, the angle of contact between the plastically-deformable body and the deforming tool can be chosen such that the frictional work will be practically negligibly small compared to the deformation work during the plastic deformation. This angle is greater than the angle generally known for the minimum deformation force, for example, for draw dies when drawing a bar or rod. It is easy to discover by experiment, by showing the total force in relationship to the total extension. On account of the changeover from static friction to dynamic friction at the beginning of the extension, there is a maximum value which depends upon the angle mentioned above and which is to be kept as small as possible. This maximum value is greater than the later, substantially constant damping force. This can be ascertained mathematically from the equation for the frictional work A:

$$A = L \cdot (\mu)/(\sin \alpha \cdot \cos \alpha),$$

in which L is the deformation work alone, $\mu$ is the coefficient of dynamic friction and $\alpha$ is the angle mentioned above.

In accordance with this equation, one would indeed achieve the smallest value for the frictional work at an angle $\alpha$ of 45°; however, the choice of such a large angle is unsuitable having regard to the initial squeezing or deformation of the body which is to be plastically deformed. Satisfactory results are achieved in an angular range of $\alpha$ between 5° and 30°, particularly between 10° and 30°.

The plastically-deformable body can, with advantage, consist of structural steel with a tensile strength of about 50 Kg/mm², and in this case, a tool steel with a tensile strength of about 100 kg/mm², can be used for the deforming tool.

The plastic deformation can be particularly advantageously affected by means of the tool by reducing the cross-sectional area of the plastically-deformable body and at the same time increasing the extension length of the plastically-deformable body. In this way, an additional movement is obtained for the deceleration, over and above the normal (undeformed) movement of the plastically-deformable body. Thus, the braking force can be kept smaller with braking work which is otherwise the same. As the braking force is the product of the mass of the body of the vehicle occupant and of the braking deceleration, larger masses can be braked if the braking deceleration is fixed at its upper permissible value, or on the contrary, the braking decelerations can be reduced if the masses are fixed.

The plastically-deformable body may have a cross-sectional area adjacent the tool which gradually reduces in the direction of the movement of the plastically-deformable body relative to the tool during deformation. In other words, the plastically-deformable body can have a gradually increasing cross-section after it has finished the initial part of its deformation movement, in which case after overcoming the force caused by static friction, one then obtains a further rise in force along the length of the deformation path until the cross-section is constant and the force remains constant along the remaining deformation path of the plastically-deformable body.

Another advantage of the arrangement in accordance with the invention, in which the frictional work is kept negligibly small in relation to the total damping work, is that there is a far-reaching lack of sensitivity of the damping system during the course of time to alterations in the coefficient of friction occurring due to dirt, or the like. It is to be noted that the attachment device could only display its damping effect in the correct manner upon a collision, and for this reason will not usually be used for a number of years.

A further advantage is that the expected damping will be obtained in nearly the same manner not only at very low speeds but also principally at very high speeds, speeds corresponding to the normal speeds of vehicle traffic.

Finally, the attachment device of the invention can be arranged to have a multi-stage damping system in which a first part of the movement of the second connecting means with respect to the first connecting means causes a damping force which is substantially less than the damping force caused by a later part of the movement of the second connecting means with respect to the first connecting means; thus in the first part, a relatively small braking deceleration can be damped and the full, maximum permitted deceleration can be effective in the later or main part. In this way, it is possible to subject the occupants of the vehicle to only a small loading due to the deceleration in less dangerous accidents, while in very severe accidents the maximum permitted deceleration can be achieved. Furthermore, the attachment device can be adapted to the individual weight of the vehicle occupant at that time being protected by the safety belt, for instance by altering the free cross-section of the opening in the deforming tool or varying the tensile strength of the plastically-deformable body.

The invention will be further described, by way of example, with reference to the accompanying drawings, in which:

BRIEF DESCRIPTION OF THE DRAWINGS

FIG. 2 is a view of an attachment device in accordance with the invention with a lever tensioning device;

FIG. 3 is a view of a two-stage attachment device in accordance with the invention;

FIG. 4 is a view of an attachment device in accordance with the invention with a coiled, plastically-deformable body;

FIG. 5 is a view of a two-stage attachment device in accordance with the invention with attachment links which are pivotable in two directions at right angles;

FIG. 6 is a force-distance graph of an attachment device in accordance with the invention; and FIG. 7 is a schematic view of the co-operation of the plastically-deformable body with the deforming tool.

Figure 1:
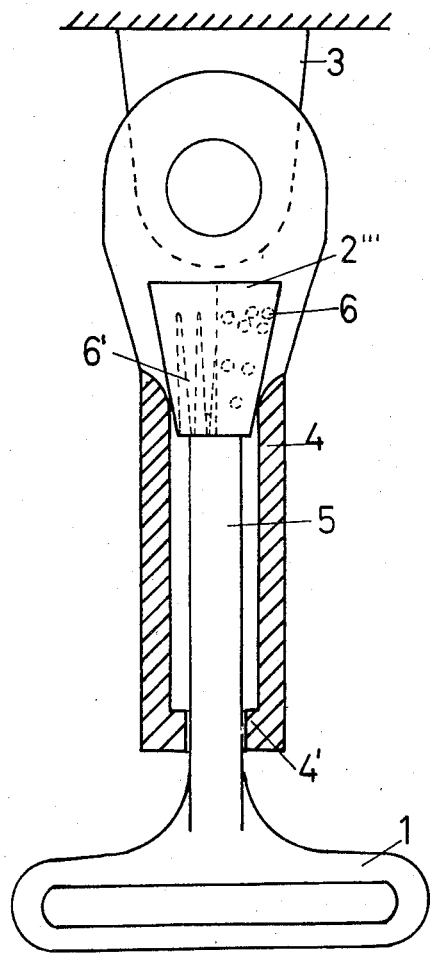
FIG. 1 is a view of a simple first embodiment of an attachment device in accordance with the invention.

In the attachment device of FIG. 1, one can see belt eye 1 for the belt (not shown in the drawing) as well as an attachment member 3 which is fixed to the frame of the vehicle and with which a casing 4 is pivotally connected. The casing 4 has a front opening 4' into which a stem 5, extending from the belt eye 1, projects, the end portion of the stem 5 forming a deforming tool 2''' in the form of a stopper. The conically-shaped stopper deforming tool 2''' lies against a narrowed-down cut-out in the casing 4, which cut-out is a plastically deformable body. In order to initiate the deforming process smoothly, the stopper tool 2''' can be formed with projecting bumps or knobs 6 or with projecting areas 6', as can be seen in the right and left parts respectively of the view of the stopper tool 2'''.

The attachment device of FIG. 2 enables the belt to be fixed very comfortably and slackly to the belt eye 1 during normal use while on the other hand, when required, the belt is tightened before the damping occurs. A lever 7, pivoted to the casing 4, serves this purpose; one end of the lever 7 has a weight 8 and the other end lies against an abutment 9 on the plastically-deformable body 2. When required, in emergency, the weight 8 of the lever 7 first speeds in the direction of the belt eye 1, before the body of the occupant of the vehicle moves, and the lever 7 draws the belt eye 1 back towards the casing 4 while tightening the belt. In this way, the deforming tool is formed by ratchet-type pressure pieces 10 which are mounted for a limited pivotal movement in the casing 4 or in the attachment member; the pressure pieces 10 permit a deformation-free return movement of the stem-shaped, plastically-deformable body 2, but plastically deform the body 2 on its forward movement. It is suitable to bias the ratchet-type pieces 10 by means of springs 11 in such a way that the pressure pieces 10 are permanently pressed lightly against the plastically-deformable body 2. In order to be able to provide for freeing the safety belt if the safety belt is unintentionally tightened, a manually-operated ring 12 is mounted on the forward end of the casing 4 by means of which pressure can be applied to the ratchet-type pressure pieces 10 via pins 13; in this manner the pressure pieces 10 free the plastically-deformable body 2 so that one can draw the belt eye 1 away from the casing 4 without deforming the plastically-deformable body 2.

In the two-stage embodiment according to FIG. 3, two-steel bolts 17 are used for deforming the plastically-deformable body 2 which is formed as a stem attached to the belt eye 1; in turn, the bolts 17 are carried in a plastically-deformable intermediate body 4″. The plastically-deformable intermediate body 4″ is itself acted upon by a further pair of bolts 17′, each of which is held in an attachment member 4‴. As can be seen without further explanation, the bore holes for receiving the pairs of bolts 17 or 17′ can be different distances apart and in this way the deformation of the plastically-deformable body can be more or less severe, according to choice. In this way, one can both provide for an individual adaptation to the weight of the vehicle occupant and also allow both deformation steps to occur with braking decelerations which differ from one another, so that for example the stem 2 can first be drawn out from the intermediate body 4″ with small braking deceleration and immediately afterwards the intermediate body 4″ can be drawn out of the attachment member 4‴.

In the embodiment of FIG. 4, the plastically-deformable body is a rolled up band or a rolled up rod 23, one of whose ends is connected with the belt eye 1 and the other of whose ends is broadened into an end abutment. The member 3, fixed to the vehicle frame, has a connecting bolt 25 and a casing 24, of circular cross-section, surrounds the bolt 25 and has an exit opening 27 which forms the deforming tool. In this way, the whole attachment device can be constructed so as to have a relatively small dimension in the direction of the belt axis.

The two-stage acting attachment device of FIG. 5 has a fixing member 4‴ which is to be articulated to the vehicle; a plastically-deformable body 2, bent into a U-shape is pivotally mounted in the attachment member 4‴ in such a way that the pivot axis lies in the plane containing the U-shape, i.e., runs across FIG. 5 from left to right. In this manner, a double link is formed which enables the attachment device to adjust itself exactly into the direction of tension when required. The U-shaped bent, plastically-deformable body 2 is made of structural steel, and its part which is provided for deformation is acted upon by two pairs of bolts 17 formed of tool-steel, which bolts are inserted in an undeformable intermediate piece formed as a casing 4. The ends of the limbs of the U-shaped plastically-deformable body 2 are thickened in such a manner that they form abutments which come to rest on the bolts of both pairs of bolts 17 at the end of the deformation path. A second plastically-deformable body 2′, bent in a similar U-shape, lies between the limbs of the first plastically-deformable body 2; three steel bolts 17′ are provided at the other end of the casing 4 for the deformation of the second plastically-deformable body 2′, with the middle bolt 17′ lying in the middle between the limbs of the body 2′. The ends of the limbs of the plastically-deformable body 2′ are connected with the belt eye 1, while the other end of the plastically-deformable body 2′ is widened in such a manner that is forms an abutment which limits the deformation path by coming up against all three bolts 17′.

The cross-section of the plastically-deformable bodies 2 or 2′ can be round or quadrilateral. If they are deformed by steel bolts, the deformation occurs in diametrically opposite sides with round cross-sections, while with quadrilateral cross-sections both with tools formed of steel bolts as well as with those tools which, as in FIG. 3, are formed by a round opening, the deformation takes place at the corners of the cross-section. In this way, larger dimensional tolerances can be permitted without this having a notable effect upon the deformation forces.

The graph of FIG. 6 shows schematically the variation of the damping force 29 along the length of the deformation or damping path 28 in a two-stage damping device corresponding to FIG. 3 or FIG. 5. There is first a steep increase 30 in the damping force which reaches a maximum 31 after a very short damping path, the straight line portion of this increase being due entirely to the elastic stretch in the whole attachment device. Following this maximum, the damping force 29 falls to a value 32 which it holds unchanged for a longer damping path. The maximum 31 depends upon the angle between the plastically-deformable body and the deforming tool and results from overcoming static friction and changing over to dynamic friction. If this angle is chosen as indicated above, the excess value of the maximum 31 over the normal value 32 of the damping force remains negligibly small. On further travel along the deformation path, a further increase 33 occurs in the damping force 29 as a result of the beginning of the second damping stage; this increase 33 rises to a maximum value 34 and then sinks to a constant value 35 for the remainder of the damping path 28. The maximum value 34 and the following normal value 35 correspond to the values 31 and 32 which have been discussed above.

FIG. 7 shows the incorporation of the plastically-deformable body 2 with a deformation tool formed as a round belt 17. This representation has been chosen in order to show the position of the angle $\alpha$ between the body 2 and the belt 17, which angle is important for the invention. The deforming tool 17 has a circular cross-section. Left of the tool 17, the plastically-deformable body 2 still has its full, undeformed cross-section 36, while to the right of the belt 17, the reduced cross-section 37 can be seen. An imaginary line 38 corresponds to half the cross-section of difference between the cross-sections 36 and 37. The line 38 intersects the circumference 39 of the deforming tool 17 at a point 40. The tangent at the point 40 makes the average deformation angle $\alpha$ with the line 38; in the manner suggested in accordance with the invention, the angle $\alpha$ should lie between 5° and 30° and particularly between 10° and 30°. This relatively large range for the choice of the angle $\alpha$ has the further advantage that one can have the belt 17 at different distances apart without leaving this angular range, and thereby achieve differing damping forces.

The "means for reducing the effect of static friction" shown in FIG. 1, for instance the bumps or knobs 6 or the lands 6′, are applied to the initial part of the stem in the embodiments of any of FIGS. 2 to 5.

The effect of static friction depends on the relationship between the deforming tool and the plastically deformable body and thus the deformation angle $\alpha$. The means for reducing the effect static friction are applied to either the tool or the body depending on the desired deformation angle $\alpha$.

I claim:

1. An attachment device for a retaining belt which may be subjected to tensile stress, the attachment device including first connecting means for mounting the device, second connecting means for connecting the belt to the device, the second connecting means being movable with respect to the first connecting means in the direction of the tensile stress, means defining a force path between the first and second connecting means, the force path defining means including at least two generally rectilinear plastically-deformable bodies, which are movable with respect to each other, extend substantially in the direction of tensile stress on the respective deformable bodies, and are in series in the force path, and the force path defining means also including at least one tool for acting on adjacent zones of each respective plastically-deformable body along a resultant line of action at an angle to the direction of the tensile stress on the plastically-deformable body, and for plastically deforming the respective plastically-deformable body by reducing the cross-sectional area and increasing the length thereof, and applying a deformation force to the plastically-deformable body which is substantially constant along a substantial proportion of the path of relative movement between the respective tool and the plastically-deformable body, thereby enabling the second connecting means to be drawn away from the first connecting means when the belt is subjected to sufficient tensile stress, and means for reducing the effect of friction between each tool and each plastically-deformable body at the beginning of the deformation movement, the deformation force exerted by one plastically-deformable body being substantially different from that exerted by the other plastically-deformable body.

2. The attachment device as claimed in claim 1, wherein at least one of the plastically-deformable bodies has an abutment on the end portion of the part which is to be plastically deformed, with the abutment being arranged to abut against the respective tool at the end of the deformation movement.

3. The attachment device as claimed in claim 1 said first connecting means permits the plastically-deformable bodies to pivot about two axes at right angles to each other and at right angles to the direction of the tensile stress, said first connecting means comprising an attachment pivoted to the plastically-deformable body adjacent thereto in said force path.

4. The attachment device as claimed in claim 1, wherein at least one of the plastically-deformable bodies is of structural steel, the tool of tool steel and said angle is between 10° and 30°.

5. The attachment device as claimed in claim 1, wherein at least one of the plastically-deformable bodies comprises a zone adjacent the respective tool whose cross-sectional area gradually reduces in the direction of the movement of the plastically-deformable body relative to the tool during deformation.

6. The attachment device as claimed in claim 1, wherein at least one of the tools is a ring.

7. The attachment device as claimed in claim 1, including at least two of said tools, each tool being a round-section member, with one member on each side of the plastically-deformable body.

8. The attachment device as claimed in claim 1, wherein one of said plastically-deformable bodies is a plastically-deformable intermediate body, one said tool being mounted in the intermediate body, and a further tool being for plastically deforming the intermediate body, the deformation force exerted by the further tool on the intermediate body being substantially different from that exerted by the first mentioned tool on the first mentioned body, thereby providing a further system which extends with plastic deformation of a plastically-deformable body when the belt is subjected to sufficient tensile stress.

9. The attachment device as claimed in claim 1, the first connecting means and the second connecting means being connected to respective plastically-deformable bodies, the attachment device including an undeformable intermediate piece, and said tools being mounted on the undeformable intermediate piece and co-operating with the respective plastically-deformable bodies.

10. The attachment device as claimed in claim 9, further including two U-shaped members each having two limbs, said limbs defining respective plastically-deformable bodies, tools engaging the limbs of the U-shaped members.

11. The attachment device as claimed in claim 1, a first part of the movement of the second connecting means with respect to the first connecting means causes a damping force which is substantially less than the damping force caused by a later part of the movement of the second connecting means with respect to the first connecting means.

12. The attachment device as claimed in claim 1, including a pivoted lever co-operating with at least one of the plastically-deformable bodies to draw the second connecting means towards the first connecting means on actuating the lever while the respective tool allows the second connecting means to be so drawn without plastically deforming the plastically-deformable body, the lever having a greater effective mass on one side of its pivot than on the other side, whereby when the lever is subjected to rapid deceleration, the lever moves rapidly and draws the second connecting means towards the first connecting means without deforming the plastically-deformable body.

13. The attachment device as claimed in claim 12, including manually operative means for releasing the respective tool whereby the second connecting means can be drawn away from the first connecting means without deforming the respective plastically-deformable body.

14. The attachment devices as claimed in claim 1, wherein the portion of at least one of the plastically-deformable bodies which is deformed has a quadrilateral cross-section and the tool engages the corners of the cross-section.

15. The attachment device as claimed in claim 1, wherein the portion of at least one of the plastically-deformable bodies which is deformed has a substantially round cross-section.

* * * * *